United States Patent
Patel et al.

(10) Patent No.: US 11,528,688 B2
(45) Date of Patent: Dec. 13, 2022

(54) UPLINK PROCEDURES ON A WIRELESS COMMUNICATION MEDIUM

(71) Applicant: QUALCOMM Incorporated, San Diego, CA (US)

(72) Inventors: Chirag Sureshbhai Patel, San Diego, CA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 25 days.

(21) Appl. No.: 17/080,691

(22) Filed: Oct. 26, 2020

(65) Prior Publication Data

US 2021/0045107 A1    Feb. 11, 2021

Related U.S. Application Data

(63) Continuation of application No. 15/433,724, filed on Feb. 15, 2017, now Pat. No. 10,827,471.

(60) Provisional application No. 62/296,026, filed on Feb. 16, 2016.

(51) Int. Cl.
| | | |
|---|---|---|
| *H04W 72/04* | (2009.01) | |
| *H04L 5/00* | (2006.01) | |
| *H04B 7/06* | (2006.01) | |

(52) U.S. Cl.
CPC ...... *H04W 72/0413* (2013.01); *H04B 7/0632* (2013.01); *H04L 5/0053* (2013.01); *H04L 5/0055* (2013.01)

(58) Field of Classification Search
None
See application file for complete search history.

(56) References Cited

U.S. PATENT DOCUMENTS

| | | | |
|---|---|---|---|
| 2012/0099545 A1 | 4/2012 | Han et al. | |
| 2012/0113827 A1* | 5/2012 | Yamada | H04W 36/06 370/252 |
| 2012/0135696 A1 | 5/2012 | Lerzer et al. | |
| 2012/0243497 A1 | 9/2012 | Chung et al. | |

(Continued)

FOREIGN PATENT DOCUMENTS

| | | |
|---|---|---|
| CN | 102651911 A | 8/2012 |
| EP | 2737766 A1 | 6/2014 |

(Continued)

OTHER PUBLICATIONS

Apple Inc., et al., "Verizon 5G TF; Air Interface Working Group; Verizon 5th Generation Radio Access; Multiplexing and channel coding (Release 1)," TS V5G.212 V1.6 (Dec. 2016), pp. 1-62.

(Continued)

*Primary Examiner* — Phirin Sam
(74) *Attorney, Agent, or Firm* — Muncy, Geissler, Olds & Lowe, P.C.

(57) ABSTRACT

Techniques for managing uplink communication on a wireless communication medium are disclosed. An access point may transmit and an access terminal may receive an Uplink Control Information (UCI) payload indicator over a downlink channel instructing an access terminal to configure a UCI payload. The access terminal may then transmit and the access point may then receive UCI including the configured UCI payload over an uplink channel in response to the UCI payload indicator.

28 Claims, 11 Drawing Sheets

(56) References Cited

U.S. PATENT DOCUMENTS

| | | | |
|---|---|---|---|
| 2013/0128854 A1* | 5/2013 | Nakashima | H04L 1/1861 370/329 |
| 2013/0258978 A1* | 10/2013 | Aiba | H04L 1/1812 370/329 |
| 2013/0294381 A1 | 11/2013 | Wang et al. | |
| 2013/0322391 A1 | 12/2013 | Yang et al. | |
| 2014/0233517 A1* | 8/2014 | Seo | H04L 5/0055 370/329 |
| 2014/0293921 A1 | 10/2014 | Tang | |
| 2014/0307643 A1 | 10/2014 | Froberg et al. | |
| 2015/0009926 A1 | 1/2015 | Seo et al. | |
| 2015/0055518 A1 | 2/2015 | Park et al. | |
| 2016/0373915 A1 | 12/2016 | Kim et al. | |
| 2017/0215157 A1 | 7/2017 | Yang et al. | |
| 2017/0238306 A1 | 8/2017 | Patel et al. | |
| 2017/0311113 A1 | 10/2017 | Abraham et al. | |
| 2017/0367058 A1 | 12/2017 | Pelletier et al. | |
| 2018/0006790 A1* | 1/2018 | Park | H04W 72/0413 |
| 2018/0014255 A1 | 1/2018 | Pelletier et al. | |
| 2018/0048498 A1 | 2/2018 | Stern-Berkowitz et al. | |
| 2018/0248664 A1 | 8/2018 | Takeda et al. | |
| 2018/0270025 A1 | 9/2018 | Kim et al. | |
| 2018/0270854 A1 | 9/2018 | Lee et al. | |
| 2018/0359772 A1 | 12/2018 | Park et al. | |
| 2021/0329676 A1* | 10/2021 | Yang | H04L 1/1861 |

FOREIGN PATENT DOCUMENTS

| | | |
|---|---|---|
| EP | 2760171 A2 | 7/2014 |
| WO | 2012111975 A2 | 8/2012 |

OTHER PUBLICATIONS

Apple Inc., et al., "Verizon 5G TF; Air Interface Working Group; Verizon 5th Generation Radio Access; Physical layer procedures (Release 1)," TS V5G.213 V1.5 (Dec. 2016), pp. 1-51.

Ericsson: "NB-IoT—UL UCP," 3GPP Draft; R1-160279—NB-IOT—UCI Design, 3rd Generation Partnership Project (3GPP), Mobile Competence Centre ; 650, Route Des Lucioles ; F-06921 Sophia-Antipolis Cedex ; France vol. RAN WG1, No. St Julian's, Malta; Feb. 15, 2016-Feb. 19, 2016 Feb. 14, 2016 (Feb. 14, 2016), XP051053619, Retrieved from the Internet: URL:http://www.3gpp.org/ftp/Meetings_3GPP_SYNC/RAN1/Docsj - - [retrieved on Feb. 14, 2016] Section 3.2 and 4; p. 3-p. 5.

International Preliminary Report on Patentability—PCT/US2017/018083, the International Bureau of WIPO—Geneva, Switzerland, dated Jan. 29, 2018.

International Search Report and Written Opinion—PCT/US2017/018083—ISA/EPO—dated May 22, 2017.

Taiwan Search Report—TW106105018—TIPO—dated Sep. 15, 2020.

Samsung: "Coding and RE Mapping for Multiple UCI for eCA", 3GPP TSG RAN WG1 #82bis, R1-155444, Malmo, Sweden, Oct. 5-9, 2015, p. 14.

* cited by examiner

UPLINK PROCEDURES ON A WIRELESS COMMUNICATION MEDIUM

CROSS-REFERENCE TO RELATED APPLICATIONS

The present application claims the benefit of U.S. Provisional Application No. 62/296,026, entitled "Uplink Procedures on a Shared Communication Medium," filed Feb. 16, 2016. The present application is a continuation of application Ser. No. 15/433,724, entitled "Uplink Procedures on a Wireless Communication Medium," filed Feb. 15, 2017. Both applications are assigned to the assignee hereof and expressly incorporated herein by reference in their entirety.

BACKGROUND

Aspects of this disclosure relate generally to telecommunications, and more particularly to operations on a wireless communication medium and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as $5^{th}$ Generation (5G)/New Radio (NR), Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell operations have been extended into so-called "unlicensed" and "lightly licensed" frequency spectra, for example, such as the Unlicensed National Information Infrastructure (U-NII) band and the Citizens Broadband (CB) Radio Service band. This extension of small cell operation is designed to increase spectral efficiency and hence overall system capacity. However, it may also lead to varying degrees of interference between small cell access points and operators as their devices compete for access to wireless resources.

SUMMARY

The following summary is an overview provided solely to aid in the description of various aspects of the disclosure and is provided solely for illustration of the aspects and not limitation thereof.

In one example, a method of communication at an access terminal is disclosed. The method may comprise receiving an Uplink Control Information (UCI) resource indicator over a downlink (DL) channel via Downlink Control Information (DCI) signaling. The UCI resource indicator may comprise a reporting configuration for at least one acknowledgement (ACK) message by the access terminal. The method may also comprise generating an ACK message. The method may further comprise transmitting the ACK message over a Physical Uplink Control Channel (PUCCH) based on the reporting configuration indicated by the UCI resource indicator.

In another example, an access terminal is disclosed. The access terminal may comprise at least one transceiver, at least one memory, and at least one processor operatively coupled to the at least one memory and the at least one transceiver. The at least one processor, the at least one memory, and/or the at least one transceiver may be configured to receive an Uplink Control Information (UCI) resource indicator over a downlink (DL) channel via Downlink Control Information (DCI) signaling. The UCI resource indicator may comprise a reporting configuration for at least one acknowledgement (ACK) message by the access terminal. The at least one processor, the at least one memory, and/or the at least one transceiver may also be configured to generate an ACK message. The at least one processor, the at least one memory, and/or the at least one transceiver may further be configured to transmit the ACK message over a Physical Uplink Control Channel (PUCCH) based on the reporting configuration indicated by the UCI resource indicator.

In another example, a method of communication at an access point is disclosed. The method may comprise generating an Uplink Control Information (UCI) resource indicator. The UCI resource indicator may comprise a reporting configuration for at least one acknowledgement (ACK) message by an access terminal. The method may also comprise transmitting the UCI resource indicator over a downlink (DL) channel via Downlink Control Information (DCI) signaling. The method may further comprise receiving an acknowledgement (ACK) message over a Physical Uplink Control Channel (PUCCH). The ACK message may be based on the reporting configuration indicated by the UCI resource indicator.

In another example, an access point is disclosed. The access point may comprise at least one transceiver, at least one memory, and at least one processor operatively coupled to the at least one memory and the at least one transceiver. The at least one processor, the at least one memory, and/or the at least one transceiver may be configured to generate an Uplink Control Information (UCI) resource indicator. The UCI resource indicator may comprise a reporting configuration for at least one acknowledgement (ACK) message by an access terminal. The at least one processor, the at least one memory, and/or the at least one transceiver may also be configured to transmit the UCI resource indicator over a downlink (DL) channel via Downlink Control Information (DCI) signaling. The at least one processor, the at least one memory, and/or the at least one transceiver may further be configured to receive an acknowledgement (ACK) message over a Physical Uplink Control Channel (PUCCH). The ACK message may be based on the reporting configuration indicated by the UCI resource indicator.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
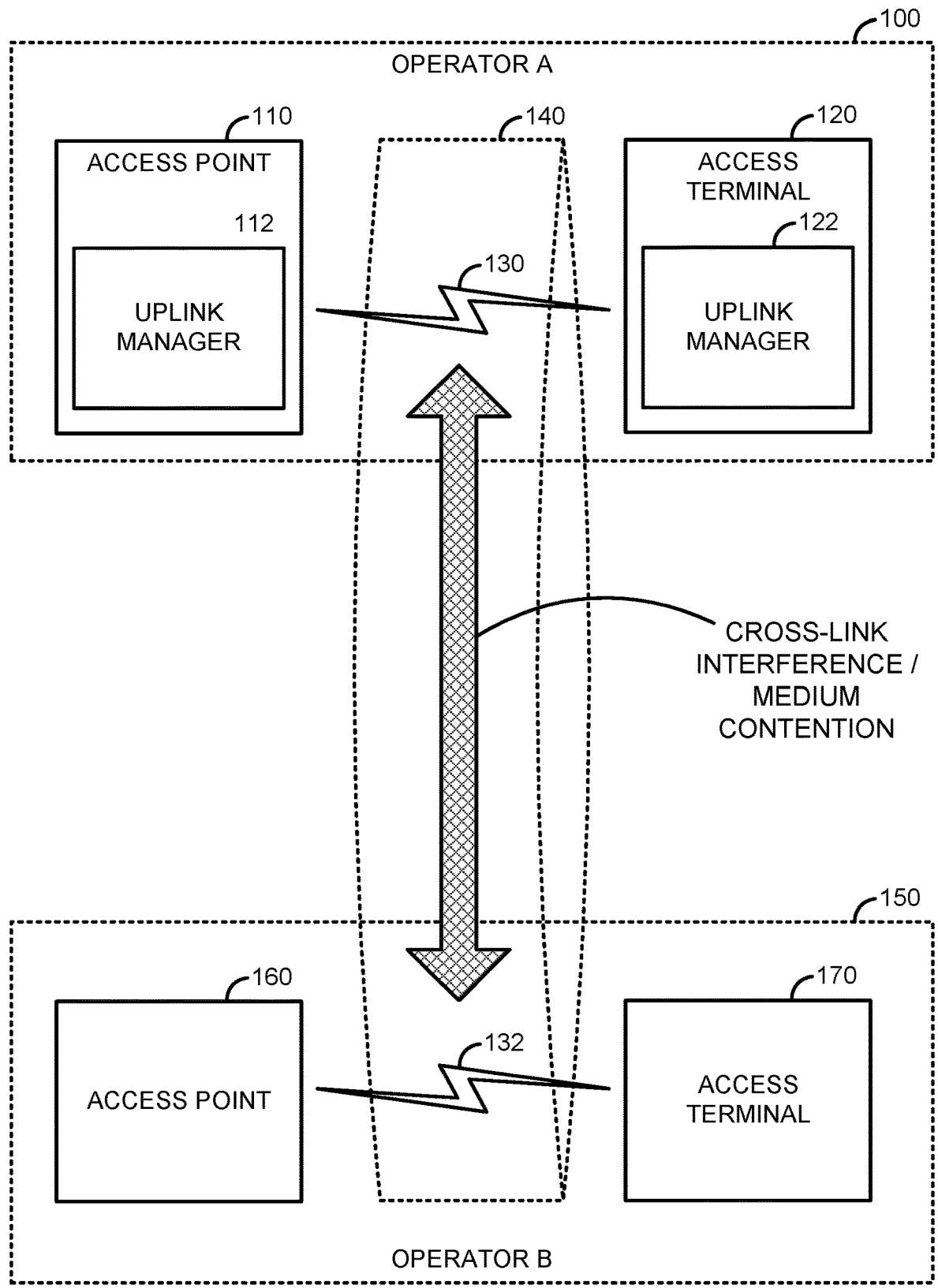
FIG. 1 is a system-level diagram illustrating an example wireless network environment.

The present disclosure relates generally to uplink communication procedures on a wireless communication medium. To better coordinate the exchange of Uplink Control Information (UCI) over the communication medium, an access point may send a UCI payload indicator to an access terminal instructing the access terminal to configure the payload for one or more upcoming UCI transmissions to convey a particular type of information (e.g., a buffer status report, acknowledgment messaging, channel quality information, etc.). The UCI payload indicator may be sent via Radio Resource Control (RRC) signaling, Downlink Control Information (DCI) signaling, and so on. The UCI transmission itself may be transmitted in different ways, including, for example, via resource interlacing with the data traffic of the access terminal on a Physical Uplink Shared Channel (PUSCH) (e.g., in the lowest or highest numbered interlace among a set of frequency-space interlaces allocated to the access terminal).

To better coordinate various random access procedures, a System Frame Number (SFN) indicator may be added to a common search space portion of a Physical Downlink Control Channel (common PDCCH) to assist the access terminal in deriving, at least in part, SFN information that may be relevant to Physical Random Access Channel (PRACH) transmission. The access terminal may decode the common PDCCH and read the SFN indicator in response to a handover command, for example, and thereby perform one or more random access procedures via the PRACH in response to the SFN indicator and common PDCCH indicating that the next subframe is an opportunity for PRACH transmission, where the opportunities for PRACH may be configured by RRC signaling or inferred from the common PDCCH (e.g., common PDCCH indicating the next subframe is a special subframe). As an example, the SFN indicator may include a parity indicator identifying whether a given radio frame is an even-numbered radio frame or an odd-numbered radio frame. As another example, the SFN indicator may include a frame boundary indicator identifying whether a given radio frame satisfies a more general periodicity constraint.

To better control open loop power operations within a Discovery Reference Signal (DRS) Transmission Window (DTxW), downlink signaling such as Cell-specific Reference Signals (CRS) received therein may be processed using one or more signal processing operations. This may be useful, for example, in measurement reporting or path loss determinations associated with setting a transmission power for uplink signaling. The signal processing operations may include, for example, (i) computing an average, minimum, or maximum across multiple CRS measurements spanning multiple subframes; (ii) filtering across subframes based on a signal-to-noise ratio indicative of reliability; (iii) utilizing only CRS measurements in the first detected subframe within the DTxW; and/or (iv) combining CRS measurements within and outside of the DTxW.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

FIG. 1 is a system-level diagram illustrating an example wireless network environment, shown by way of example as including systems from two operators, a first operator A system 100 and a second operator B system 150. Each system may be composed of different wireless nodes generally capable of receiving and/or transmitting over a wireless link, including information related to various types of communication (e.g., voice, data, multimedia services, associated control signaling, etc.). The operator A system 100 is shown as including an access point 110 and an access terminal 120 in communication with each other over a wireless link 130. The operator B system 150 is shown as including its own access point 160 and access terminal 170 in communication with each other over a separate wireless link 132.

As an example, the access point 110 and the access terminal 120 of the operator A system 100 may communicate via the wireless link 130 in accordance with a fifth generation (5G)/new (NR) technology or a variant thereof (e.g., NR-Shared Spectrum (NR-SS)) or Long Term Evolution (LTE) technology or a variant thereof (e.g., MuLTEfire, Licensed Assisted Access (LAA), etc.), while the access point 160 and the access terminal 170 of the operator B system 150 may communicate via the wireless link 132 in accordance with the same NR or LTE technology or a different technology (e.g., Wi-Fi technology) but be deployed by a different operator (e.g., a different company or other entity controlling authorization, system timing, etc.). It will be appreciated that each system may support any number of wireless nodes (access points, access terminals, etc.) distributed throughout a geographic region, with the illustrated entities being shown for illustration purposes only. Instead of LTE or NR technology, persons skilled in the art will appreciate that communications via wireless links 130 and 132 may be configured in accordance with any other suitable radio technology.

Unless otherwise noted, the terms "access terminal" and "access point" are not intended to be specific or limited to any particular Radio Access Technology (RAT). In general, access terminals may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wireless Local Area Network (WLAN) access points, other small coverage area access points, etc. Small cells may be deployed to supplement macro cell coverage, which may cover a few blocks within a neighborhood or several square miles in a rural environment, thereby leading to improved signaling, incremental capacity growth, richer user experience, and so on.

Returning to FIG. 1, the wireless link 130 used by the operator A system 100 and the wireless link 132 used by the operator B system 150 may operate over a wireless communication medium 140. A communication medium of this type may be composed of one or more frequency, time, and/or space communication resources (e.g., encompassing one or more channels across one or more carriers). As an example, the communication medium 140 may correspond to at least a portion of an unlicensed or lightly licensed frequency band. Although different licensed frequency bands have been reserved for certain communications (e.g., by a government entity such as the Federal Communications Commission (FCC) in the United States), some systems, in particular those employing small cell access points, have extended operation into unlicensed and lightly licensed frequency bands such as the Unlicensed National Information Infrastructure (U-NII) band and the Citizens Broadband (CB) Radio Service band.

In the illustrated example, the communication medium 140 is shown as being shared between the operator A system 100 and the operator B system 150. Due to the shared use of the communication medium 140, there is the potential for cross-link interference between the wireless link 130 and the wireless link 132. Further, some RATs and some jurisdictions may require contention or "Listen Before Talk (LBT)" for arbitrating access to the communication medium 140. As an example, a Clear Channel Assessment (CCA) protocol may be used in which each device verifies via medium sensing the absence of other traffic on a shared communication medium before seizing (and in some cases reserving) the communication medium for its own transmissions. In some designs, the CCA protocol may include distinct CCA Preamble Detection (CCA-PD) and CCA Energy Detection (CCA-ED) mechanisms for yielding the communication medium to intra-RAT and inter-RAT traffic, respectively. The European Telecommunications Standards Institute (ETSI), for example, mandates contention for all devices regardless of their RAT on certain communication media such as unlicensed frequency bands. It will be appreciated, however, that the uplink management techniques provided herein may be applicable to other, more dedicated communication media as well (e.g., a licensed frequency band), and may be implemented for a given operator (e.g., the operator A system 100) without requiring that another operator (e.g., the operator B system 150) be present.

As will be described in more detail below, the access point 110 and/or the access terminal 120 may be variously configured in accordance with the teachings herein to provide or otherwise support the uplink management techniques discussed briefly above. For example, the access point 110 may include an uplink manager 112 and the access terminal 120 may include an uplink manager 122. The uplink manager 112 and/or the uplink manager 122 may be configured in different ways to manage transmission and reception of information.

Figure 2:
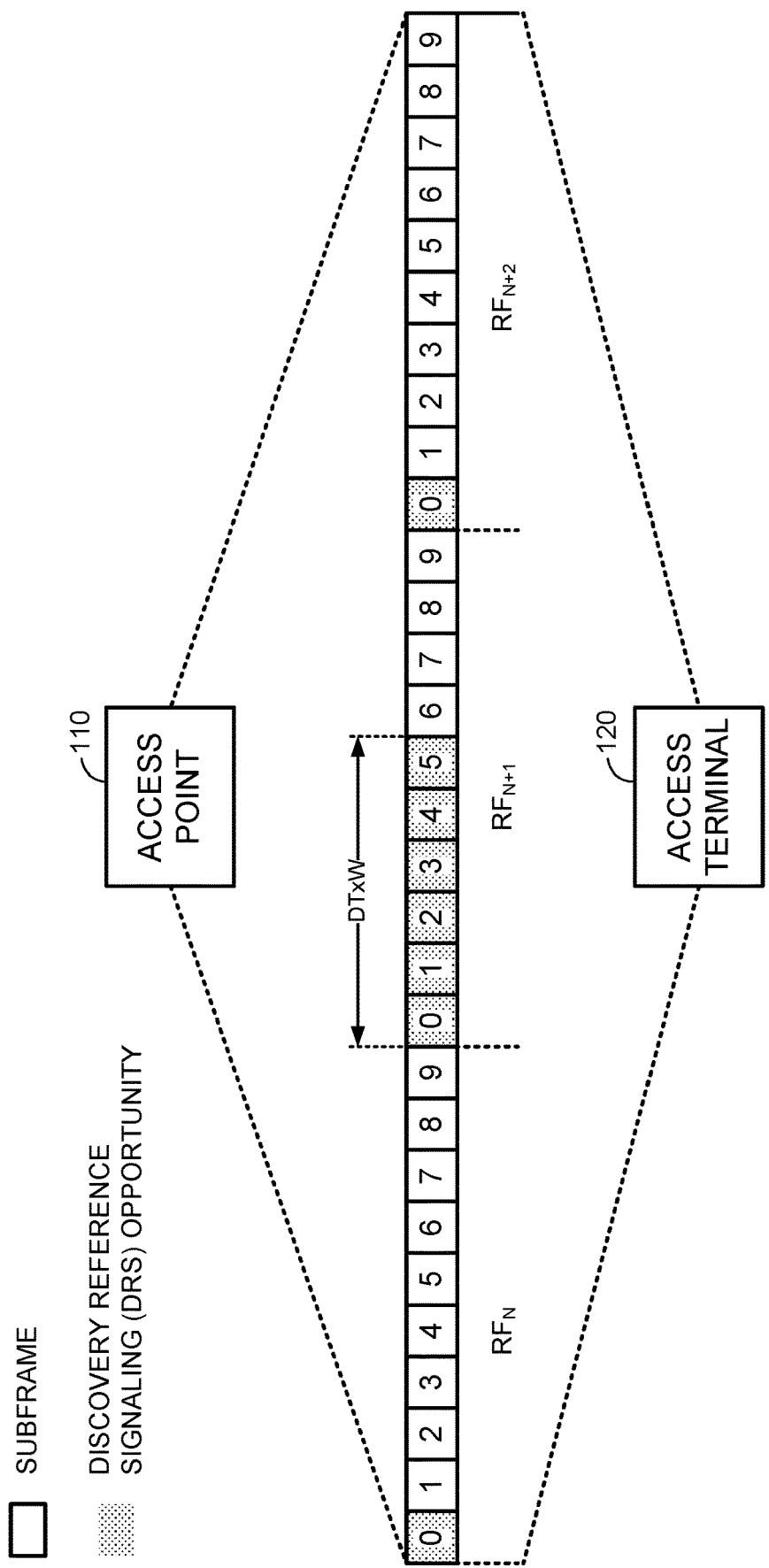
FIG. 2 illustrates an example frame structure including Discovery Reference Signal (DRS) transmission.

FIG. 2 illustrates an example frame structure that may be implemented for the primary RAT system 100 on the communication medium 140 to facilitate access to the communication medium 140.

The illustrated frame structure includes a series of radio frames (RFs) that are numbered in accordance with a system frame number numerology ($RF_N$, $RF_{N+1}$, $RF_{N+2}$, etc.) and divided into respective subframes (SFs), which may also be numbered for reference (e.g., SF0, SF1, etc.). Each respective subframe may be further divided into slots, and the slots may be further divided into symbol periods (not shown in FIG. 2). As an example, an LTE-based frame structure may include system frames that are divided into 1024 numbered radio frames composed of 10 subframes each, which together constitute a system frame cycle (e.g., lasting 10.24 s for 10 ms radio frames having 1 ms subframes). Moreover, each subframe may comprise two slots, and each slot may comprise six or seven symbol periods. The use of a frame structure may provide more natural and efficient coordination among devices than more ad hoc signaling techniques.

In general, the example frame structure of FIG. 2 may be implemented as a Frequency Division Duplex (FDD) frame structure or a Time Division Duplex (TDD) frame structure. In an FDD frame structure, each subframe on a given frequency may be statically configured for uplink (UL) communication for transmitting uplink information from the access terminal 120 to the access point 110 or for downlink (DL) communication for transmitting downlink information from the access point 110 to the access terminal 120. In a TDD frame structure, each subframe may be variously operated at different times as a downlink (D), uplink (U), or special (S) subframe. Different arrangements of downlink, uplink, and special subframes may be referred to as different TDD configurations.

In some designs, the frame structure of FIG. 2 may be "fixed" in that the location and/or configuration of each subframe may be predetermined (e.g., in relation to an absolute time). Here, if contention-based access is in effect and the access point 110 or the access terminal 120 fails to win contention for a given subframe, for example, that subframe may be silenced. In other designs, however, the frame structure of FIG. 2 may be "floating" in that the location and/or configuration of each subframe may be dynamically determined (e.g., in relation to the point at which access to the communication medium 140 is secured). As an example, the start of a given frame (e.g., $RF_{N+1}$) may be delayed in relation to an absolute time until the access point 110 or the access terminal 120 is able to win contention. As another example, the type of each subframe (downlink, uplink, or special) may be dynamically configured by the access point 110 based on when access to the communication medium 140 is secured (e.g., the next 10 subframes may be designated as DDDDDUUUUU, DDUUUUUUUU, or a different combination of subframe types).

As is further illustrated in FIG. 2, one or more subframes may be designated to include what is referred to herein as Discovery Reference Signaling (DRS). The DRS may be configured to convey reference signaling for facilitating system operation. The reference signaling may include information relevant to timing synchronization, system acquisition, interference measurements (e.g., Radio Resource Management (RRM)/Radio Link Monitoring (RLM) measurements), tracking loops, gain reference (e.g., Automatic Gain Control (AGC)), paging, etc. As an example, the DRS may include a Primary Synchronization Signal (PSS) and a Secondary Synchronization Signal (SSS) for cell searching, a Cell-specific Reference Signal (CRS) for RRM, a Physical Broadcast Channel (PBCH) for conveying various access parameters, and so on.

Different DRS transmission schemes may be implemented to facilitate more robust DRS under different scenarios, such as when contention is required for accessing the communication medium 140. For example, the DRS may be scheduled for transmission periodically (e.g., every 10 ms) in a designated subframe(s) of each radio frame (e.g., subframe SF0) or in a range of such subframes referred to herein as a DRS Transmission Window (DTxW) defined around a designated subframe (e.g., spanning the first six subframes SF0 to SF5 of the radio frame). It will be appreciated that such a DTxW may also be referred to as a DRS Measurement Timing Configuration (DMTC) window or the like, depending on the RAT employed.

As will be described in more detail below, the access terminal 120 may need to perform various uplink operations to support communication with the access point 110 on the communication medium 140. For example, the access terminal 120 may, autonomously or upon request, transmit various Uplink Control Information (UCI) to the access point 110, such as a Buffer Status Report (BSR), Acknowledgment or Non-Acknowledgment messages (ACK/NACK), Channel Quality Indicators (CQI), and so on. Various techniques are therefore provided herein to coordinate the UCI payload as well as the transmission resources associated therewith.

Figure 3:
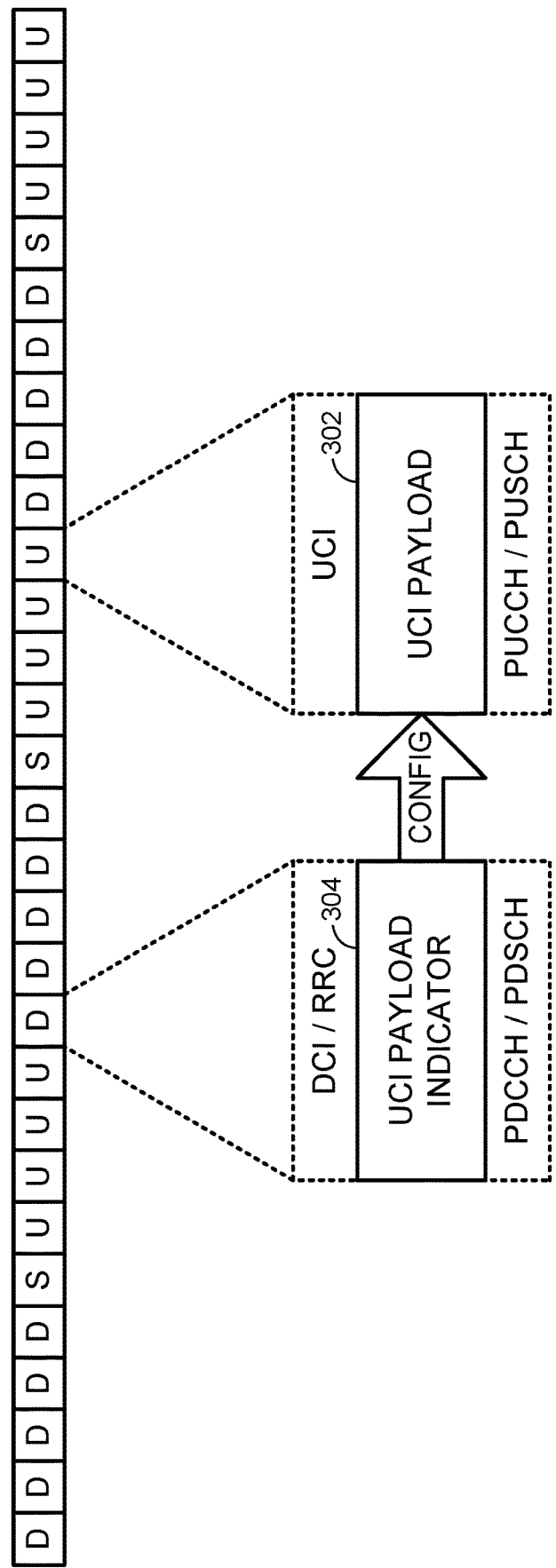
FIG. 3 is a timing diagram illustrating an example of Uplink Control Information (UCI) payload coordination.

FIG. 3 is a timing diagram illustrating an example of UCI payload coordination. In this example, the access terminal 120 transmits UCI including a UCI payload 302 composed of one or more bits during a given uplink subframe (e.g., via a Physical Uplink Control Channel (PUCCH) or a Physical Uplink Shared Channel (PUSCH)). As discussed above, the UCI payload 302 may be variously configured to convey BSR, ACK/NACK, CQI, and so on.

To control the configuration and associated content of the UCI payload 302, the access point 110 may send a UCI payload indicator 304 to the access terminal 120 during an earlier downlink subframe (e.g., via a Physical Downlink Control Channel (PDCCH) or a Physical Downlink Shared Channel (PDSCH)). The UCI payload indicator 304 may instruct the access terminal 120 to configure one or a series of upcoming UCI payloads 302 to convey a particular type of information or a combination thereof. For example, the UCI payload indicator 304 may include one or more bits that can be mapped to different types of information (e.g., 3 bits to toggle on or off the sending of ACK/NACK, CQI, and/or BSR, for transmission alone or in combination).

In some designs or scenarios, the access point 110 may send the UCI payload indicator 304 as part of its Radio Resource Control (RRC) signaling (e.g., via the PDSCH). The use of RRC signaling may allow the access point 110 to semi-statically dictate which type of information the access terminal 120 includes in the UCI payload 302. This approach may be used for both autonomous and requested instances of the UCI payload 302.

In other designs or scenarios, the access point 110 may send the UCI payload indicator 304 as part of its Downlink Control Information (DCI) signaling (e.g., via the PDCCH). In particular, when the UCI payload 302 is requested from the access terminal 120 via DCI signaling, the DCI signaling may be modified to include the UCI payload indicator 304 to identify the type of information desired. While this approach may be more suited to requested instances of the UCI payload 302, it may allow the access point 110 to more dynamically dictate, from one instance to the next, which type of information the access terminal 120 includes in the UCI payload 302.

As an example, the UCI payload indicator 304 may instruct the access terminal 120 to configure the UCI payload 302 to convey the BSR (e.g., as a scheduling request) and be transmitted by the access point 110 and received by the access terminal 120 via DCI signaling (e.g., having a particular combination of bits, such as a resource block assignment of 'zero RB', e.g., 'state 325', and a channel state/beamforming request as none, e.g., 'state 000'). The access terminal 120 may configure the BSR to indicate a scheduling request for transmitting data stored in a buffer at the access terminal 120. Based on the BSR, the access point 110 may schedule uplink resources for transmitting the data stored in the buffer at the access terminal 120.

Figure 4:
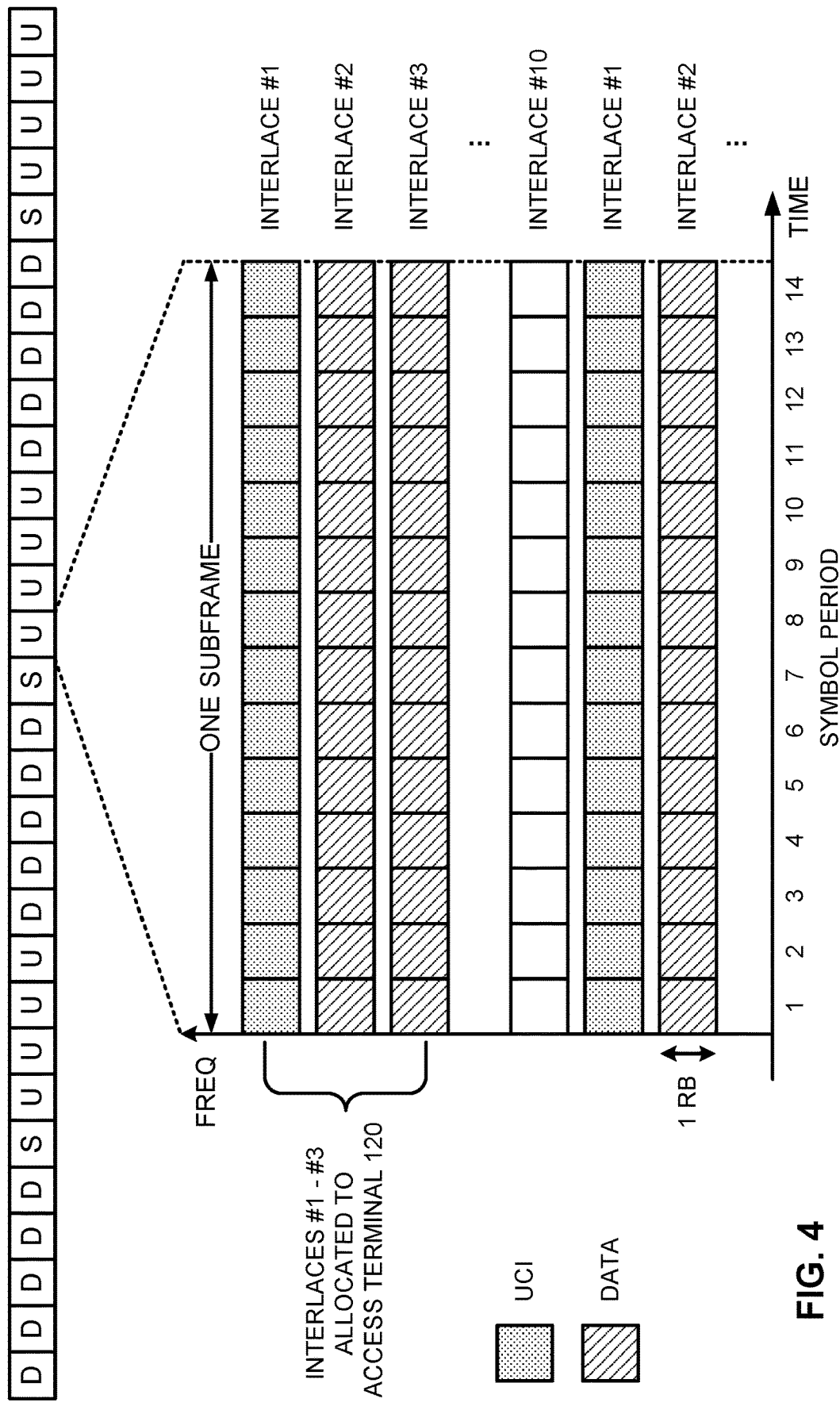
FIG. 4 is a resource map illustrating, in relevant part, an example subframe structure for UCI transmission over a user data channel shown by way of example as a Physical Uplink Shared Channel (PUSCH).

FIG. 4 is a resource map illustrating, in relevant part, an example subframe structure for UCI transmission over a user data channel shown by way of example as a PUSCH. In general, the PUSCH may span all or a portion of the symbol periods making up the subframe (e.g., 14 symbol periods for a normal cyclic prefix) in the time domain and one or more Resource Blocks (RBs) formed from a set of subcarriers in the frequency domain. Further, as shown, the PUSCH may be frequency division multiplexed by allocating different interlaces to different access terminals.

In the illustrated example, three interlaces (interlaces #1 to #3) may be allocated to the access terminal 120 for the PUSCH. As an example of an interlacing structure, for a 20 MHz channel bandwidth with 100 RBs, a set of 10 RBs consisting of every 10th RB may be dedicated to each interlace. Other access terminals and other channels such as a Physical Random Access Channel (PRACH), a Sounding Reference Signal (SRS) channel, etc. (not shown), may occupy the other intervening interlaces.

As is further shown, a subset of the resource interlaces allocated to the access terminal 120 for uplink data transmission over the PUSCH may instead be reserved for UCI transmission. This may be particularly suitable for handling large instances of the UCI payload 302. In the illustrated example, the first interlace (interlace #1) is reserved for UCI transmission while the remaining two interlaces allocated to the access terminal 120 (interlace #2 and #3) are used for data transmission. However, it will be appreciated that other or additional interlaces may be reserved for UCI transmission in other designs or scenarios. It will also be appreciated that the interlace used for UCI transmission is access terminal specific in contrast to UCI transmission over regular control channels (e.g., PUCCH), which has a separate interlace reserved for it and can be used by all access terminals.

The particular interlace(s) to be reserved for UCI transmission may be designated in different ways. For example, the lowest interlace (e.g., interlace #1) or the highest interlace (e.g., interlace #3) allocated to the access terminal 120 for the PUSCH may be predefined as the interlace to be used for UCI transmission, when UCI and uplink data payload are multiplexed together on PUSCH. Further, if there is a DCI requesting the UCI that does not grant any resources for uplink transmission, the UCI may be transmitted on dedicated resources (e.g., PUCCH resources) that have been pre-configured (e.g., by RRC signaling or an earlier DCI signaling that granted dedicated resources for PUCCH).

In addition or as an alternative, it will be appreciated that the UCI may be multiplexed within one or more PUSCH RBs on different Resource Elements (REs).

Returning to the discussion above, another example of uplink operations that the access terminal 120 may perform to support communication with the access point 110 on the communication medium 140 may include random access procedures (e.g., via a Physical Random Access Channel (PRACH)). In general, transmission over the PRACH may be defined on fixed resources configured in predefined frames and subframes. For example, transmission opportunities over the PRACH may be designated to occur in a given subframe (n) when located in even radio frames (e.g., SFN mod 2=0). However, signaling that may be ordinarily utilized by the access terminal 120 to determine the subframe and radio frame number at any given time (e.g., the PBCCH within the DRS signaling) may not always be readily available (e.g., due to the potentially shared nature of the communication medium 140), especially when the access terminal 120 has not fully synchronized with the access point 110 (e.g., during handover to the access point 110 as a target cell).

Figure 5:
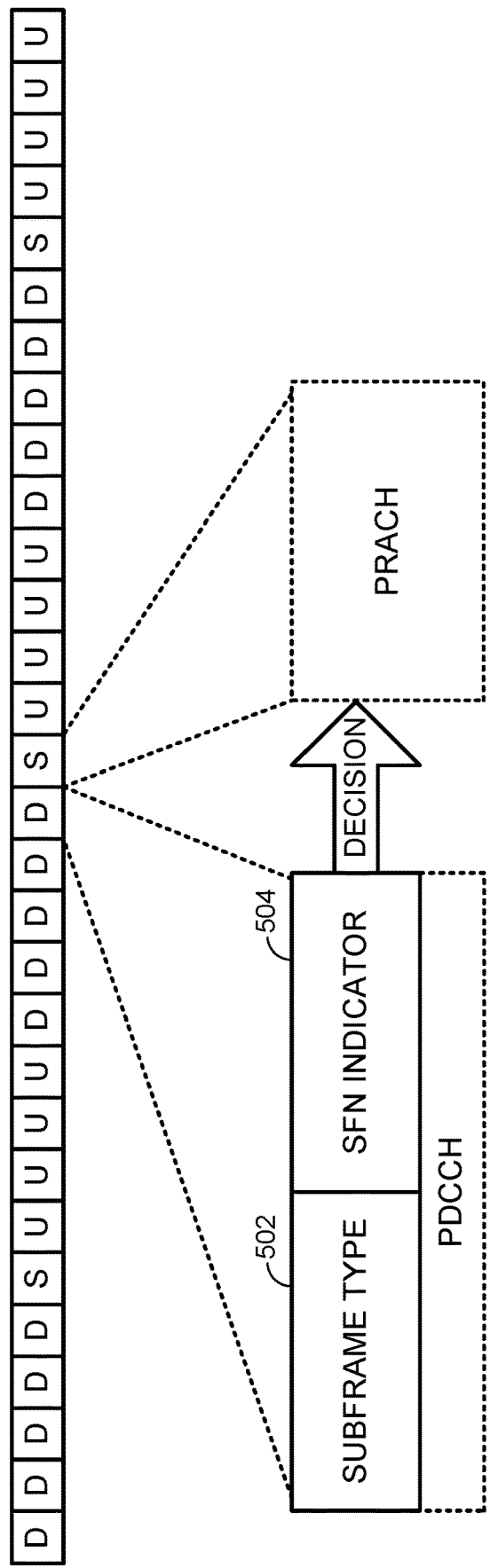
FIG. 5 is a timing diagram illustrating an example signaling scheme for facilitating random access over a Physical Random Access Channel (PRACH).

FIG. 5 is a timing diagram illustrating an example signaling scheme for facilitating random access over a PRACH. In this example, the access terminal 120 may monitor a downlink control channel, shown by way of example as a common search space portion of a Physical Downlink Control Channel (common PDCCH), for subframe type information 502 ahead of a potential PRACH transmission in the next subframe. The common PDCCH may be used to verify that the next subframe is in fact an uplink (U) or special (S) subframe that is suitable for PRACH transmission, as opposed to another downlink (D) subframe.

To assist the access terminal 120 in further identifying whether a given subframe (n) is part of a radio frame that provides an opportunity for PRACH transmission, the common PDCCH carrying the subframe type information 502 may be further configured to carry an SFN indicator 504. The SFN indicator 504 may include one or more bits that can be used by the access terminal 120 to derive, at least in relevant part, information concerning the frame number (SFN) of the next subframe. In this way, the access terminal 120 may be able to determine from the common PDCCH at subframe (n−1), for example, whether the next subframe (n) is located within a radio frame providing an opportunity for PRACH transmission without necessarily having to decode other channels (e.g., the PBCH). This may be particularly advantageous in handover scenarios where information from other channels may not be readily available.

Figure 6:
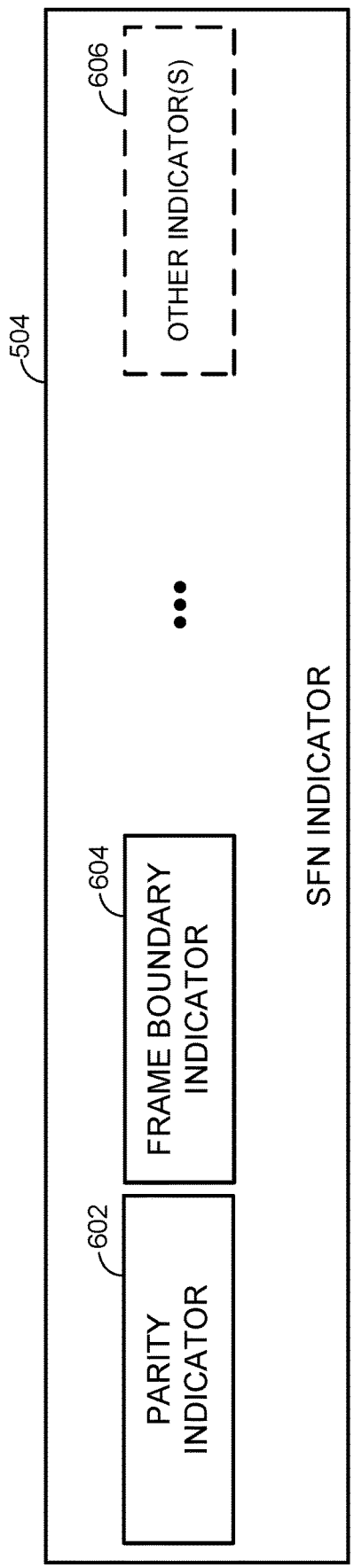
FIG. 6 illustrates an example System Frame Number (SFN) indicator that may be carried by a common Physical Downlink Control Channel (PDCCH).

FIG. 6 illustrates an example SFN indicator that may be carried by the common PDCCH. In this example, the SFN indicator 504 includes, in relevant part, a parity indicator 602, a frame boundary indicator 604, and any other indicators 606 as appropriate for a given implementation. It will be appreciated that the single SFN indicator 504 is shown for illustration purposes only, and that in different designs and scenarios the various information therein may be transmitted (broadcasted or unicasted) in different sets of messages or information blocks, as separate transmissions, and so on, or may be omitted entirely, as appropriate.

The parity indicator 602 may be used to indicate whether the SFN of a given radio frame is even (SFN mod 2=0) or odd (SFN mod 2=1). As an example, the parity indicator 602 may correspond to the least significant bit of the SFN, indicating that the frame is even (e.g., bit='0') or odd (e.g., bit='1'). The indication may be for the current subframe in which the common PDCCH is carried or for the next subframe for which the PRACH transmission determination is made. As discussed above, PRACH transmission may be designated only for even frames, for example, and providing a parity indication in the common PDCCH that the access terminal 120 is already monitoring for the subframe type 502 may allow the access terminal 120 to make a quick determination as to whether the next subframe is suitable for PRACH transmission as occurring in an even numbered radio frame.

The frame boundary indicator 604 may be used to more generally indicate whether the SFN of a given radio frame is located at a particular periodic radio frame boundary occurring every M radio frames (e.g., SFN mod M=0). As an example, the frame boundary indicator 604 may correspond to the two least significant bits of the SFN, indicating that, among consecutive groups of four radio frames, the frame coincides with the first radio frame (e.g., bits='00'), the second radio frame (e.g., bits='01'), the third radio frame (e.g., bits='10'), or the fourth radio frame (e.g., bits='11'). In this way, the frame boundary indicator 604 may be used to identify suitable radio frames with longer periodicities (e.g., where PRACH is designated to occur only every fourth radio frame rather than every other radio frame). Alternatively, the different combinations of the bits in the frame boundary indicator 604 may be mapped to shorter periodicities when required. For example, when the PRACH is designated to occur every other radio frame, the first and third radio frames may be mapped to odd radio frames and the second and fourth radio frames may be mapped to even radio frames, and so on. It will be appreciated that more or less bits may be utilized for the frame boundary indicator 604 to accommodate any given periodicity as desired.

Figure 7:
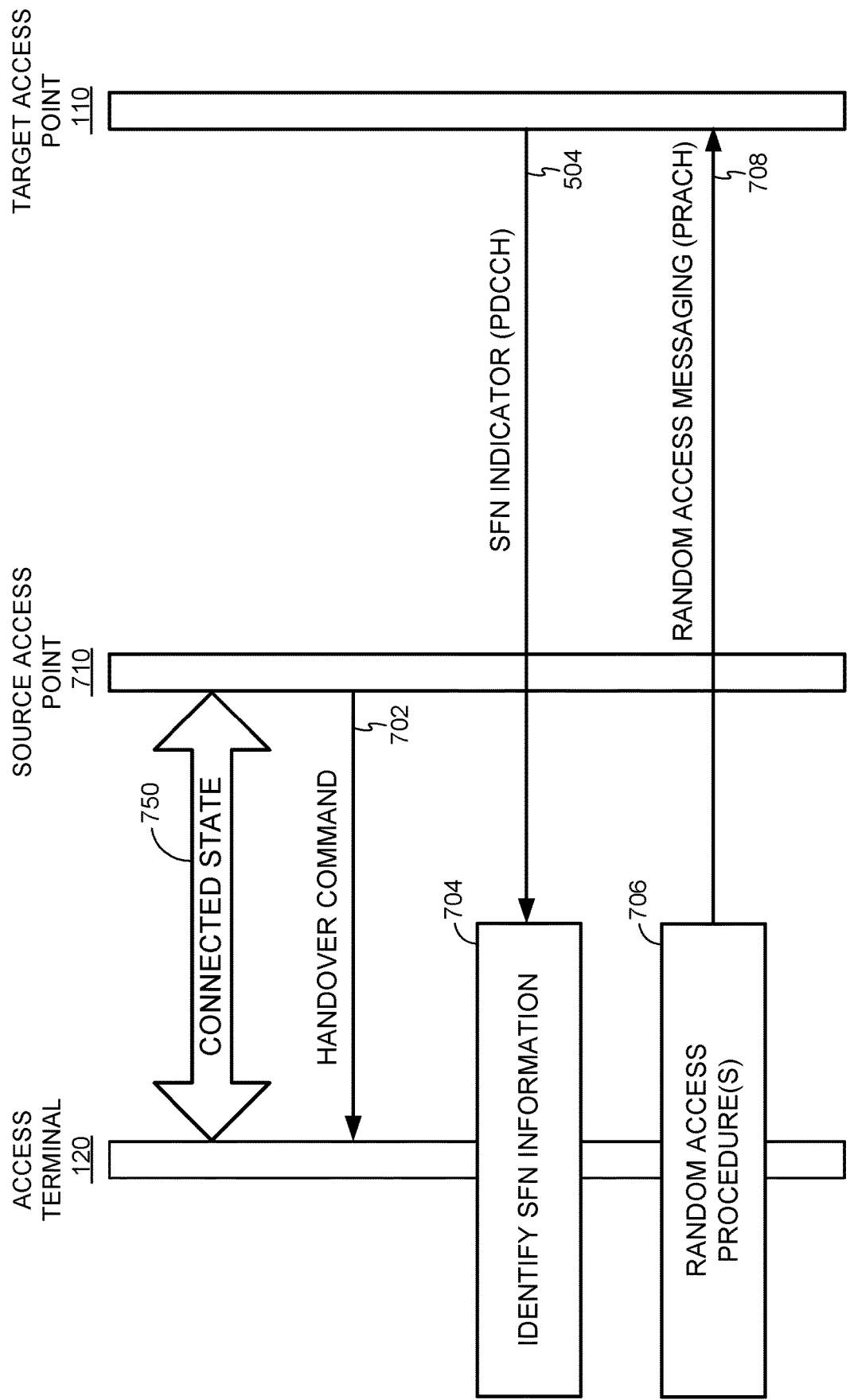
FIG. 7 is a signaling flow diagram illustrating example aspects of a handover messaging exchange facilitated by an SFN indicator as provided herein.

FIG. 7 is a signaling flow diagram illustrating example aspects of a handover messaging exchange facilitated by an SFN indicator as provided herein. In this example, the access terminal 120 is operating in a connected state 750 with an access point 710 that serves as a "source" access point for the handover procedure. The access point 110 may be a neighboring access point operating nearby and serve as a "target" access point for the handover procedure. It will be appreciated that the illustrated signaling is a generalization shown only in relevant part, and that certain illustrated signaling may be omitted while other signaling may be added for a given handover procedure implementation. It will also be appreciated that handover between cells of different access points is shown for illustration purposes only, and that in some instances handover may in fact be performed between different cells of a single access point.

During its connection with the access terminal 120 (e.g., an RRC connection or the like), the source access point 710 may send to the access terminal 120 a handover command 702 instructing the access terminal 120 to handover to the target access point 110. After receiving the handover command 702, the access terminal 120 may attempt to decode the common PDCCH of the target access point 110 and read the SFN indicator 504 to identify relevant SFN information as discussed in more detail above (block 704). Based on the identified SFN information indicating that the next subframe is suitable for transmitting PRACH, the access terminal 120 may perform one or more random access procedures (block 706) and send any corresponding random access signaling 708 to the target access point 110 over the PRACH.

Returning again to the discussion above, another example of uplink operations that the access terminal 120 may perform to support communication with the access point 110 on the communication medium 140 may include open loop power control. In general, the access terminal 120 may determine a path loss to its serving cell at the access point 110 by measuring downlink signal strength (e.g., a Reference Signal Received Power (RSRP) measurement of the serving cell) and use this path loss to determine a transmit power level for transmission on uplink channels (e.g., PRACH, PUSCH, etc.). Because of the potential for uncertainty associated with downlink signal transmissions (e.g., due to the potentially shared nature of the communication medium 140), the access terminal 120 may be configured to measure downlink signal strength in predefined subframes. For example, the access terminal 120 may measure received power of CRS that is part of a subframe carrying DRS or CRS that is part of all subframes within the DTxW. However, the actual power with which the CRS is transmitted by the access point 110 may vary within DTxW subframes (e.g., depending on whether one or more carriers are utilized by the access point 110).

Figure 8:
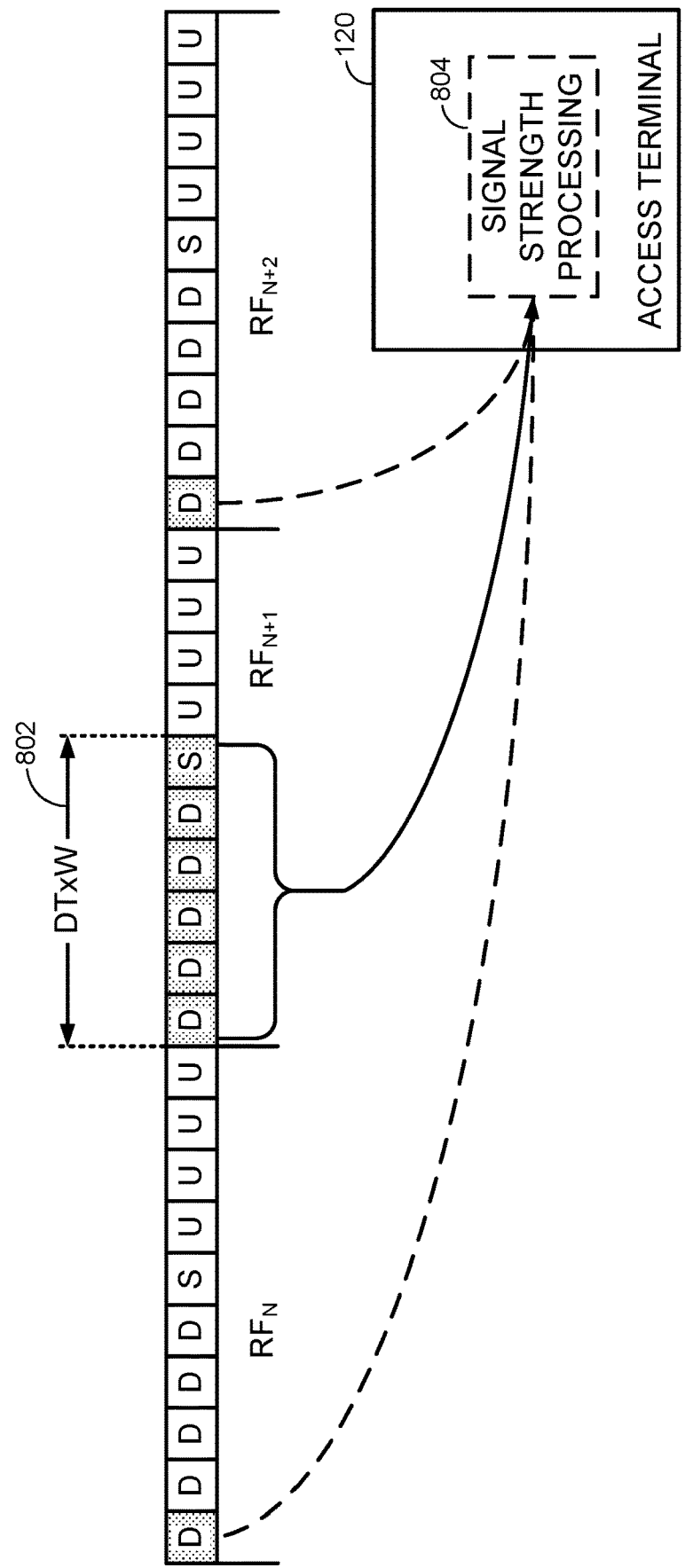
FIG. 8 is a signal timing diagram illustrating an example of downlink signal strength processing for open loop power control on the uplink.

FIG. 8 is a signal timing diagram illustrating an example of downlink signal strength processing for open loop power control on the uplink. In this example, the access terminal 120 may monitor CRS or some other signal strength indicator within a DTxW 802 shown as spanning the first six subframes of a given radio frame $RF_{N+1}$, any subframes of which may represent a potential DRS transmission opportunity as described in more detail above.

To improve the reliability of downlink signal strength measurements within the DTxW 802, the access terminal 120 may perform various signal strength processing operations 804 in determining downlink signal strength and subsequently path loss for open loop power control operation. As an example, the final RSRP used for the path loss determination may be computed as an average, minimum, or maximum of all CRS measurements performed in one or more subframes. As another example, the access terminal 120 may filter out unreliable information and consider only certain subframes as valid based on whether the signal-to-noise ratio of the CRS signal in that subframe exceeds a threshold or other suitable criteria that indicates reliable CRS transmission detection. As another example, the access terminal 120 may also use the RSRP of the first detected subframe in the DTxW 802 for serving cell path loss determination. As another example, the access terminal 120 may also combine CRS measurements performed within the DTxW 802 with CRS measurements performed outside of the DTxW 802 (shown by way of example as dashed lines in FIG. 8).

Similar procedures involving averaging/minimum/maximum operations of received CRS signal strength in one or more subframes of the DTxW 802 can be used for determining RSRP for RRM measurements and reporting, such as when reporting the downlink signal strength of serving and neighbor cells for RRM purposes. Similar procedures can also be applied for determining the path loss to a target cell during a RACH procedure for handover. For RACH during handover, the access terminal 120 may also determine the path loss to the target cell based on CRS signal strength measured in a subframe carrying common PDCCH that is used to determine a RACH transmission opportunity in the next subframe.

Figure 9:
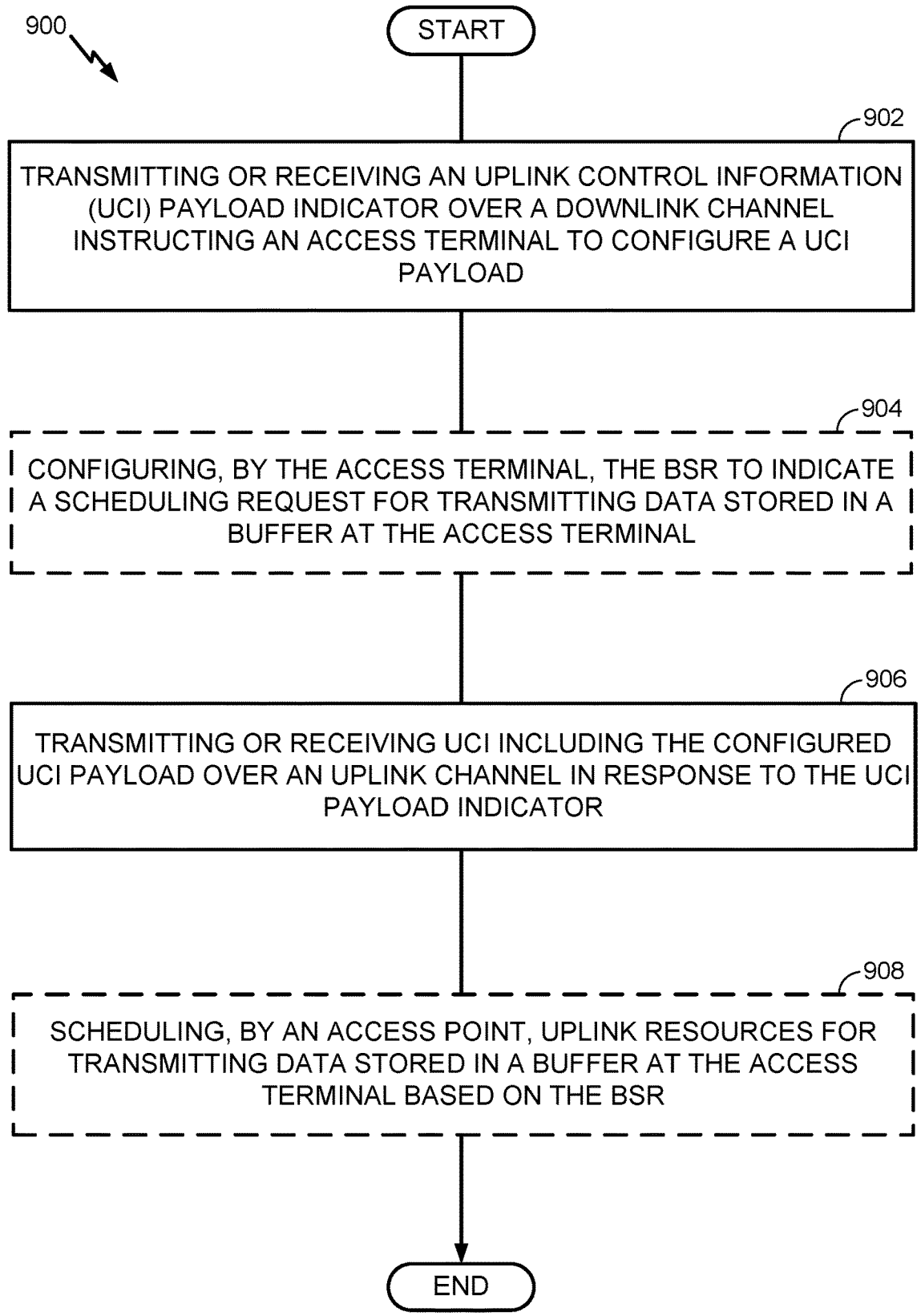
FIG. 9 is a flow diagram illustrating an example method of communication in accordance with the techniques described herein.

FIG. 9 is a flow diagram illustrating an example method of communication in accordance with the techniques described above. The method 900 may be performed, for example, by an access point or an access terminal (e.g., the access point 110 or the access terminal 120 illustrated in FIG. 1) operating on a wireless communication medium. As an example, the communication medium may include one or more time, frequency, or space resources on a licensed or unlicensed radio frequency band.

As shown, the access point or the access terminal may transmit or receive, respectively, a UCI payload indicator over a downlink channel instructing the access terminal to configure a UCI payload (block 902). The access terminal or the access point may then transmit or receive, respectively, UCI including the configured UCI payload over an uplink channel in response to the UCI payload indicator (block 906).

As discussed in more detail above, the UCI payload indicator instructs the access terminal to configure the UCI payload to convey a BSR, an ACK/NACK, a CQI, or a combination thereof. As an example, the UCI payload indicator may instruct the access terminal to configure the UCI payload to convey the BSR and be transmitted or received via DCI signaling. In this example, the access terminal may configure the BSR to indicate a scheduling request for transmitting data stored in a buffer at the access terminal (optional block 904). Meanwhile, the access point may schedule uplink resources for transmitting data stored in the buffer at the access terminal based on the BSR (optional block 908).

In some designs or scenarios, the UCI payload indicator may be transmitted or received via DCI signaling. The DCI signaling may be transmitted or received, for example, over a PDCCH or the like. In other designs or scenarios, the UCI payload indicator may be transmitted or received via RRC signaling.

As also discussed in more detail above, the UCI including the configured UCI payload may be transmitted or received on a subset of less than all resource interlaces allocated to the access terminal for a PUSCH. As an example, the subset may be predefined as the lowest or highest numbered resource interlace among the resource interlaces allocated to the access terminal.

For generality, the access point 110 and the access terminal 120 are shown in FIG. 1 only in relevant part as including the uplink manager 112 and the uplink manager 122, respectively. It will be appreciated, however, that the access point 110 and the access terminal 120 may be configured in various ways to provide or otherwise support the uplink signaling techniques discussed herein.

Figure 10:
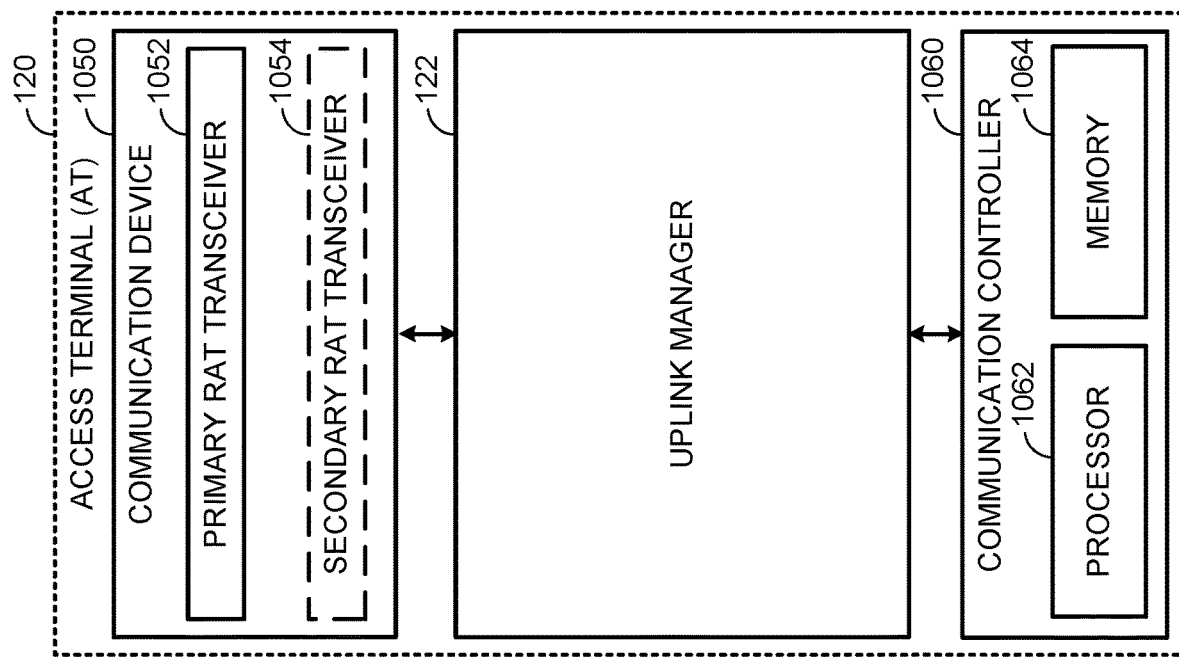
FIG. 10 is a device-level diagram illustrating example components of an access point and an access terminal in more detail.
Figure 10:
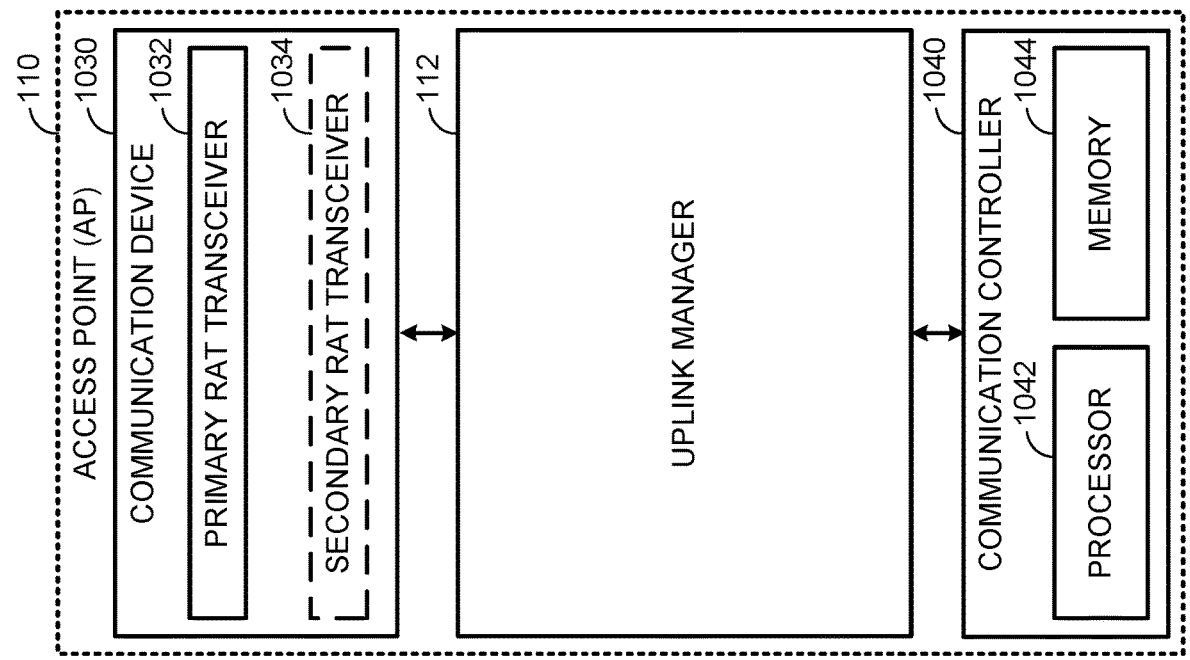

FIG. 10 is a device-level diagram illustrating example components of the access point 110 and the access terminal 120 in more detail. As shown, the access point 110 and the access terminal 120 may each generally include a wireless communication device (represented by the communication devices 1030 and 1050) for communicating with other wireless nodes via at least one designated RAT. The communication devices 1030 and 1050 may be variously configured for transmitting and encoding signals, and, conversely, for receiving and decoding signals in accordance with the designated RAT (e.g., messages, indications, information, pilots, and so on).

The communication devices 1030 and 1050 may include, for example, one or more transceivers, such as respective primary RAT transceivers 1032 and 1052, and, in some designs, (optional) co-located secondary RAT transceivers 1034 and 1054, respectively (corresponding, for example, to the RAT employed by the operator B system 150, if different than the operator A system 100). As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a radio chip or similar circuitry providing low-level sniffing only). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The access point 110 and the access terminal 120 may also each generally include a communication controller (represented by the communication controllers 1040 and 1060) for controlling operation of their respective communication devices 1030 and 1050 (e.g., directing, modifying, enabling, disabling, etc.). The communication controllers 1040 and 1060 may include one or more processors 1042 and 1062, and one or more memories 1044 and 1064 coupled to the processors 1042 and 1062, respectively. The memories 1044 and 1064 may be configured to store data, instructions, or a combination thereof, either as on-board cache memory, as separate components, a combination, etc. The processors 1042 and 1062 and the memories 1044 and 1064 may be standalone communication components or may be part of the respective host system functionality of the access point 110 and the access terminal 120.

It will be appreciated that the uplink manager 112 and the uplink manager 122 may be implemented in different ways. In some designs, some or all of the functionality associated therewith may be implemented by or otherwise at the direction of at least one processor (e.g., one or more of the processors 1042 and/or one or more of the processors 1062), at least one memory (e.g., one or more of the memories 1044 and/or one or more of the memories 1064), at least one transceiver (e.g., one or more of the transceivers 1032 and 1034 and/or one or more of the transceivers 1052 and 1054), or a combination thereof. In other designs, some or all of the functionality associated therewith may be implemented as a series of interrelated functional modules.

Accordingly, it will be appreciated that the components in FIG. 10 may be used to perform operations described above with respect to FIGS. 1-9. For example, the access point 110 may transmit, via the processor 1042 and the memory 1044 directing the primary RAT transceiver 1032, a UCI payload indicator over a downlink channel instructing the access terminal 120 to configure a UCI payload. The access point 110 may then receive, via the processor 1042 and the memory 1044 directing the primary RAT transceiver 1032, UCI including the configured UCI payload over an uplink channel in response to the UCI payload indicator.

As another example, the access terminal 120 may receive, via the processor 1062 and the memory 1064 directing the primary RAT transceiver 1052, a UCI payload indicator over a downlink channel instructing the access terminal 120 to configure a UCI payload. The access terminal 120 may then transmit, via the processor 1062 and the memory 1064 directing the primary RAT transceiver 1052, UCI including the configured UCI payload over an uplink channel in response to the UCI payload indicator.

Figure 11:
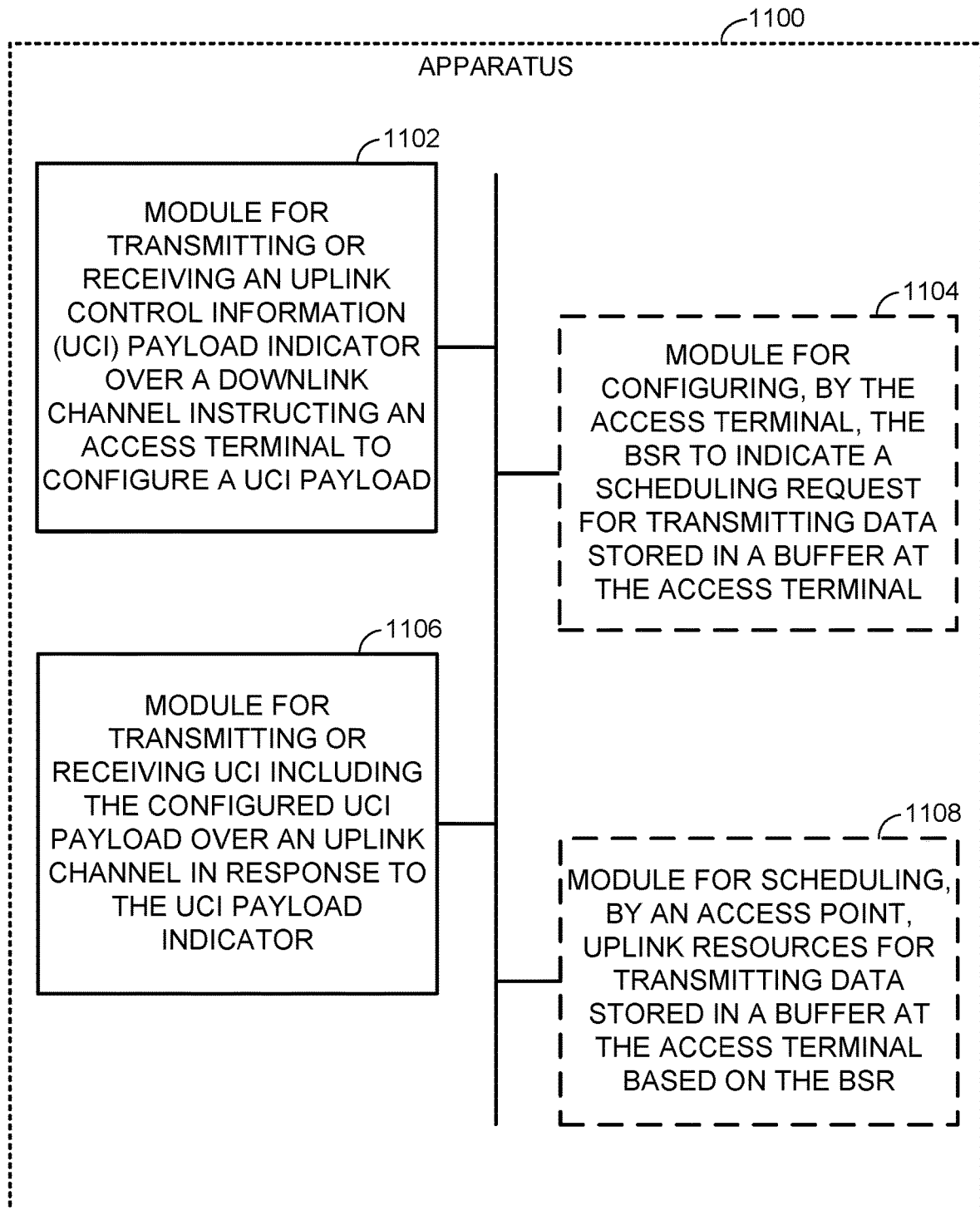
FIG. 11 illustrates an example apparatus represented as a series of interrelated functional modules.

FIG. 11 illustrates an example access point or access terminal apparatus for implementing the uplink manager 112 and/or the uplink manager 122 represented as a series of interrelated functional modules. In the illustrated example, the apparatus 1100 includes a module for transmitting or receiving 1102, an (optional) module for configuring 1104, a module for transmitting or receiving 1106, and an (optional) module for scheduling 1108.

The module for transmitting or receiving 1102 may be configured to transmit or receive a UCI payload indicator over a downlink channel instructing the access terminal to configure a UCI payload. The (optional) module for configuring 1104 may be configured to configure a BSR, when the UCI payload indicator instructs the access terminal to configure the UCI payload to convey the BSR, to indicate a scheduling request for transmitting data stored in a buffer at the access terminal. The module for transmitting or receiving 1106 may be configured to transmit or receive UCI including the configured UCI payload over an uplink channel in response to the UCI payload indicator. The (optional) module for scheduling may be configured to schedule, when the UCI payload indicator instructs the access terminal to configure the UCI payload to convey the BSR, uplink resources for transmitting data stored in the buffer at the access terminal based on the BSR.

The functionality of the modules of FIG. 11 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 11, as well as other components and functions described herein, may be implemented using any suitable means. Such means also may be implemented, at least in part, using corresponding structure as taught herein. For example, the components described above in conjunction with the "module for" components of FIG. 11 also may correspond to similarly designated "means for" functionality. Thus, in some aspects one or more of such means may be implemented using one or more of processor components, integrated circuits, or other suitable structure as taught herein, including as an algorithm. One skilled in the art will recognize in this disclosure an algorithm represented in the prose described above, as well in sequences of actions that may be represented by pseudocode. For example, the components and functions represented by FIG. 11 may include code for performing a LOAD operation, a COMPARE operation, a RETURN operation, an IF-THEN-ELSE loop, and so on.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of communication at an access terminal, the method comprising:
    receiving an Uplink Control Information (UCI) resource indicator over a downlink (DL) channel via Downlink Control Information (DCI) signaling, the UCI resource indicator comprising a reporting configuration for at least one acknowledgement (ACK) message by the access terminal;
    generating an ACK message; and
    transmitting the ACK message over a Physical Uplink Control Channel (PUCCH) based on the reporting configuration indicated by the UCI resource indicator.

2. The method of claim 1, wherein the UCI resource indicator is received from an access point and the ACK message is transmitted to the access point.

3. The method of claim 1, wherein the ACK message is multiplexed with data payload in the PUCCH.

4. The method of claim 1,
    wherein the ACK message is included in a UCI payload transmitted over the PUCCH, and
    wherein the received UCI resource indicator comprises one or more bits in which different combinations of the one or more bits are mapped to instruct the access terminal to configure the UCI payload to convey corresponding different types of information.

5. The method of claim 4, wherein at least one of the different types of information is the ACK message.

6. The method of claim 1, wherein the ACK message is transmitted over dedicated resources in the PUCCH.

7. The method of claim 6, wherein the dedicated resources in the PUCCH are configured through radio resource control (RRC) signaling or through an earlier DCI signaling.

8. A method of communication at an access point, the method comprising:
    generating an Uplink Control Information (UCI) resource indicator comprising a reporting configuration for at least one acknowledgement (ACK) message by an access terminal;

transmitting the UCI resource indicator over a downlink (DL) channel via Downlink Control Information (DCI) signaling; and receiving an acknowledgement (ACK) message over a Physical Uplink Control Channel (PUCCH), the ACK message being based on the reporting configuration indicated by the UCI resource indicator.

9. The method of claim 8, wherein the UCI resource indicator is transmitted to the access terminal and the ACK message is received from the access terminal.

10. The method of claim 8, wherein the ACK message is multiplexed with data payload in the PUCCH.

11. The method of claim 8, wherein the ACK message is included in a UCI payload received over the PUCCH, and wherein the transmitted UCI resource indicator comprises one or more bits in which different combinations of the one or more bits are mapped to instruct the access terminal to configure the UCI payload to convey corresponding different types of information.

12. The method of claim 11, wherein at least one of the different types of information is the ACK message.

13. The method of claim 8, wherein the ACK message is received over dedicated resources in the PUCCH.

14. The method of claim 13, wherein the dedicated resources in the PUCCH are configured through radio resource control (RRC) signaling or through an earlier DCI signaling.

15. An access terminal, comprising:
at least one transceiver;
at least one memory; and
at least one processor operatively coupled to the at least one memory and the at least one transceiver, the at least one processor, the at least one memory, and/or the at least one transceiver being configured to:
receive an Uplink Control Information (UCI) resource indicator over a downlink (DL) channel via Downlink Control Information (DCI) signaling, the UCI resource indicator comprising a reporting configuration for at least one acknowledgement (ACK) message by the access terminal;
generate an ACK message; and
transmit the ACK message over a Physical Uplink Control Channel (PUCCH) based on the reporting configuration indicated by the UCI resource indicator.

16. The access terminal of claim 15, wherein the at least one processor, the at least one memory, and/or the at least one transceiver are configured to receive the UCI resource indicator from an access point and transmit the ACK message to the access point.

17. The access terminal of claim 15, wherein the at least one processor, the at least one memory, and/or the at least one transceiver are configured to multiplex the ACK message with data payload in the PUCCH.

18. The access terminal of claim 15,
wherein the ACK message is included in a UCI payload transmitted over the PUCCH, and wherein the received UCI resource indicator comprises one or more bits in which different combinations of the one or more bits are mapped to instruct the access terminal to configure the UCI payload to convey corresponding different types of information.

19. The access terminal of claim 18, wherein at least one of the different types of information is the ACK message.

20. The access terminal of claim 15, wherein the ACK message is transmitted over dedicated resources in the PUCCH.

21. The access terminal of claim 20, wherein the dedicated resources in the PUCCH are configured through radio resource control (RRC) signaling or through an earlier DCI signaling.

22. An access point, comprising:
at least one transceiver;
at least one memory; and
at least one processor operatively coupled to the at least one memory and the at least one transceiver, the at least one processor, the at least one memory, and/or the at least one transceiver being configured to:
generate an Uplink Control Information (UCI) resource indicator comprising a reporting configuration for at least one acknowledgement (ACK) message by an access terminal;
transmit the UCI resource indicator over a downlink (DL) channel via Downlink Control Information (DCI) signaling; and
receive an acknowledgement (ACK) message over a Physical Uplink Control Channel (PUCCH), the ACK message being based on the reporting configuration indicated by the UCI resource indicator.

23. The access point claim 22, wherein the at least one processor, the at least one memory, and/or the at least one transceiver are configured to transmit the UCI resource indicator to the access terminal and receive the ACK message from the access terminal.

24. The access point claim 22, wherein the ACK message is multiplexed with data payload in the PUCCH.

25. The access point claim 22,
wherein the ACK message is included in a UCI payload received over the PUCCH, and wherein the transmitted UCI resource indicator comprises one or more bits in which different combinations of the one or more bits are mapped to instruct the access terminal to configure the UCI payload to convey corresponding different types of information.

26. The access point of claim 25, wherein at least one of the different types of information is the ACK message.

27. The access point claim 22, wherein the at least one processor, the at least one memory, and/or the at least one transceiver are configured to receive the ACK message over dedicated resources in the PUCCH.

28. The access point of claim 27, wherein the dedicated resources in the PUCCH are configured through radio resource control (RRC) signaling or through an earlier DCI signaling.

* * * * *